United States Patent [19]

Verma

[11] 4,143,012
[45] Mar. 6, 1979

[54] WATER BASED MODIFIED STYRENE ALLYL ALCOHOL RESIN PRIMER

[75] Inventor: Monica H. Verma, Troy, Mich.

[73] Assignee: E. I. Du Pont de Nemours and Company, Wilmington, Del.

[21] Appl. No.: 871,118

[22] Filed: Jan. 20, 1978

Related U.S. Application Data

[63] Continuation-in-part of Ser. No. 738,855, Nov. 4, 1976.

[51] Int. Cl.$^2$ .................. C09D 3/74; C09D 5/02; C09D 5/08
[52] U.S. Cl. ............... 260/23 ST; 260/23 S; 428/334
[58] Field of Search .............. 260/23 S, 23 ST; 428/334

[56] References Cited

U.S. PATENT DOCUMENTS

| | | | |
|---|---|---|---|
| 2,588,890 | 3/1952 | Shokal et al. | 260/23 S |
| 2,647,094 | 7/1953 | Hahn | 260/23 S |
| 2,894,938 | 7/1959 | Chapin et al. | 260/23 S |
| 2,940,946 | 6/1960 | Shokal et al. | 260/23 S |
| 3,646,099 | 2/1972 | Dannals | 260/465.5 R |
| 3,650,998 | 3/1972 | Sekmakas et al. | 260/23 S |
| 3,929,701 | 12/1975 | Hall et al. | 260/23 ST |
| 3,969,569 | 7/1976 | Vasta | 428/332 |

*Primary Examiner*—Ronald W. Griffin

[57] ABSTRACT

An aqueous primer composition that can be dried at ambient temperatures and that is useful for priming substrates such as steel, polyester reinforced with fiberglass, acrylonitrile/butadiene/styrene plastics that are used in automobile and truck bodies comprises a reaction product of a styrene/allyl alcohol polymer, drying oil fatty acids and maleic acid or maleic anhydride;

the composition contains pigments in a pigment to binder ratio of about 300/100 to 10/100; typical pigments are talc, barytes, and zinc/calcium molybdate; and the composition contains a sufficient amount of ammonia or an amine to provide a pH of about 6.5–8.5.

7 Claims, No Drawings

WATER BASED MODIFIED STYRENE ALLYL ALCOHOL RESIN PRIMER

CROSS REFERENCE TO RELATED APPLICATIONS

This application is a continuation-in-part application of Ser. No. 738,855 filed Nov. 4, 1976.

BACKGROUND OF THE INVENTION

This invention is related to a primer composition and in particular to an aqueous primer composition.

It has become increasingly important for paint manufacturers to provide coating compositions that are non-air polluting and that can be dried at ambient temperatures to save energy. Along with the above characteristics, the automotive and truck body repair industry have requirements that primers have excellent adhesion to all types of painted and unpainted substrates, provide good resistance to corrosion, can be easily sanded to give a smooth surface and provide a surface to which conventional refinish paints will adhere.

Conventional alkyd resin primers are well known but none have a combination of properties that meet the above requirements whereas the novel aqueous primer composition of this invention meets these requirements.

SUMMARY OF THE INVENTION

An aqueous primer composition containing 5-50% by weight of film-forming binder and 50-95% by weight of an aqueous medium;
wherein the binder is a reaction product of a styrene-/allyl alcohol polymer, drying oil fatty acids and maleic acid or maleic anhydride;
the composition contains a sufficient amount of ammonia or an amine to provide the composition with a pH of 6.5-8.5.

DETAILED DESCRIPTION OF THE INVENTION

The aqueous primer composition contains about 5-50% by weight of film-forming binder. Generally, about 20-40% by weight of binder is used. The remainder of the composition is an aqueous medium that contains water and, optionally, water soluble or miscible solvents and dispersants.

Usually the primer contains dispersed pigments in a pigment-to-binder weight ratio of about 300/100 to 10/100. Typical pigments that are used are talc, barytes, zinc molybdate, calcium molybdate, basic zinc/calcium molybdate, zinc oxide, calcium phosphosilicate and mixtures thereof. These pigments provide excellent corrosion resistance to the primer. Other pigments can be added for color such as red and yellow iron oxides, carbon black, titanium dioxide, and the like.

Typical solvents that can be used are water miscible or water soluble and are as follows: ethers, aliphatic alcohols such as methanol, ethanol, propanol, isopropanol and butanol, ethylene glycol monoalkyl ethers, such as ethylene glycol monobutyl ether, propylene glycol monopropyl ether, ethylene glycol monoalkyl ether acetates, and the like.

The binder of the primer composition is a reaction product of a sytrene/allyl alcohol polymer that has been reacted with drying oil fatty acids and maleic acid or maleic anhydride.

The styrene/allyl alcohol polymer preferably contains about 90-70% by weight styrene and 10-30% by weight allyl alcohol. This polymer has a hydroxyl content of about 3-9% and a specific viscosity of about 0.4-0.8% measured at 25° C. using 10 grams of polymer in 100 milliliters of methyl ethyl ketone.

Typical drying oil fatty acids that are used in the preparation of the reaction product are as follows: dehydrated castor oil fatty acids, heat-bodied soya oil fatty acids, tung oil fatty acids, linseed oil fatty acids, oiticia oil fatty acids, safflower oil fatty acids and the like. One particularly useful fatty acid is linoleic acid which is obtained from conventional drying oil fatty acids.

The reaction product has a Gardner Holdt Viscosity measured at 25° C. and 65% solids of about U to $Z^2$.

Preferably, the reaction product contains about 40-60% by weight of styrene/allyl alcohol polymer, 35-55% by weight of drying oil fatty acids and 5-25% by weight of maleic acid or maleic anhydride.

One particularly useful reaction product that forms a high quality primer is the reaction product of a styrene-/allyl alcohol polymer containing about 80% styrene and 20% allyl alcohol, linoleic acid and maleic anhydride.

The above reaction product is dispersed in water by mixing the reaction product with an amine or ammonia and then with water. A sufficient amount of an amine or ammonia is used to provide the resulting composition with a pH of about 6.5-8.5. Generally, the pH of the primer composition is about 7-8.

Typical amines that can be used are triethylamine, trimethylamine, ethanolamines, N,N-diethylethanolamine, N,N-dimethylethanolamine, N-methylethanolamine, monoisopropanolamine, butanolamine, ethylenediamine, diethylamine and the like. Triethylamine, and N,N-dimethylethanol amine are preferred since these amines form good quality products.

Generally, about 0.05 to 1.0% by weight, based on the weight of the composition, of a dispersant is added. Typically useful dispersants are anionic polyelectrolytes such as Polywet ND-1 and Polywet ND-2. Preferred anionic polyelectrolyte dispersants are oligomers of acrylonitrile and acrylic acid that are terminated with a metal sulfonate such as sodium sulfonate. One particularly useful dispersant of this type has the formula

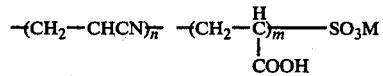

where n and m are sufficiently large to provide a molecular weight of about 500-2500 and M is an alkali metal ion such as sodium. Preparation of these dispersants are taught in Dannals U.S. Pat. No. 3,646,099 issued Feb. 29, 1972.

Driers usually are added in amounts of 0.1 to 1.0% by weight based on the weight of the composition. Typical driers are cobalt naphthenate, manganese naphthenate, nickel naphthenate, nickel octoate, zirconium octate, lead tallate, cobalt carboxylate salt of 8-20 carbon atom carboxylic acids, manganese carboxylate salt of 8-12 carbon atom carboxylic acids and the like.

As aforementioned, the composition is pigmented for most uses. The pigments are formed into a mill base by grinding the pigment with a water dispersible resin, water and an amine and the resulting mill base is added to an aqueous reaction product dispersion to form a pigmented primer composition. The mill base is prepared by conventional grinding techniques such as sand grinding, ball milling, attritor grinding and the like. Generally, the water dispersible resin used in the mill base is the same as the binder used in the primer. Usually, one of the aforementioned dispersants is added to aid in dispersing pigments.

The primer composition can be applied to a variety of substrates such as metal, painted metal, wood, glass, fiberglass reinforced with polyester resin, plastics and the like by any of the conventional application methods such as spraying, electrostatic spraying, dipping, brushing, flow coating, roller coating and the like. Water or solvents can be added to the composition to adjust the viscosity of the composition for the application method. The resulting coatings can be dried at ambient temperatures or baked at relatively low temperatures up to about 140° C. for about 5 minutes to 2 hours. The resulting coating is about 0.1–5 mils thick and if pigmented can be easily sanded to provide a smooth surface.

The composition has excellent adhesion to all types of substrates such as bare metal, metal painted with an acrylic enamel, acrylic lacquer, acrylic dispersion enamel, acrylic dispersion lacquer, alkyd enamel, conventional alkyd or epoxy primers or fiberglass reinforced with polyester painted as above or acrylonitrile butadiene/styrene plastics painted as above. Conventional refinish acrylic enamels or lacquers can be applied over the primer composition and provide a high quality topcoat finish. Usually about a 1–5 mil thick acrylic topcoat is applied. The aforementioned characteristics make the composition particularly useful as a primer used in the repair of automobiles and truck bodies.

EXAMPLE 1

A primer is prepared as follows:

| Portion 1 | Parts by Weight |
| --- | --- |
| Resin solution (65% solids in propanol of a styrene/allyl alcohol polymer having a weight ratio of 80/20 of styrene to allyl alcohol that has been reacted linoleic acid and further reacted with maleic anhydride and neutralized with N,N-dimethylethanolamine) | 29.80 |
| Cobalt Naphthenate solution (54% solids of cobalt naphthenate in mineral spirits) | 0.26 |
| Drier stabilizer solution (35% of 1,10 phenanthroline and 2 ethyl hexoic acid in n-butanol) | 0.08 |
| Methyl ethyl ketoxime | 0.08 |
| Loss of dry inhibitor solution (Nyact ® NOPB metallic soap of calcium and zinc in mineral spirits made by Tenneco Chemicals) | 0.38 |
| Anionic polyelectrolyte dispersant (Polywet ND-1 dispersant made by Uniroyal which is believed to be a sodium salt of an oligomer of acrylonitrile and acylic acid terminated with a sulfonate prepared according to U.S. Pat. No. 3,646,099) | 0.06 |
| Talc pigment | 5.72 |
| Barytes pigment | 24.46 |
| Zinc Oxide pigment | 6.52 |
| Red Iron Oxide pigment | 4.08 |
| Deionized Water | 28.56 |
| Total | 100.00 |

The above constituents are charged into a conventional ballmill and ground for 48,000 cycles to form a primer composition. The pH of the composition is adjusted to about 7.0–7.2 by the addition of N,N-dimethylethanolamine. The resulting primer composition is reduced to a spray viscosity with deionized water of 30 seconds measured with a No. 2 Zahn cup at 25° C.

The resulting primer is sprayed onto phosphatized steel panels are dried at room temperature (about 25° C.) for about 24 hours. The resulting primer finish is about 0.8 mil thick and has a hardness after 4 days of about 4.3 knoops, a gloss of 9 measured at 20°, a gloss of 47 measured at 60° and has a tape adhesion of 10 measured as in Example 1.

Conventional finishes of an acrylic lacquer, an acrylic dispersion lacquer, an acrylic enamel, an acrylic dispersion enamel, an acrylic water based enamel, an alkyd resin or a polyurethane enamel can be applied to metal substrates having a primer coating of the above primer. These finishes have excellent appearance, excellent adhesion to the primer and good weathering properties even after long periods of outdoor exposure and have good corrosion resistance.

EXAMPLE 2

A mill base is prepared as follows:

| | Parts by Weight |
| --- | --- |
| Titanium dioxide pigment | 473 |
| Carbon black pigment (Furnace Black) | 9 |
| Amorphous silica pigment | 1197 |
| Talc pigment | 1351 |
| zinc phospho oxide | 818 |
| Anionic polyelectrolyte dispersant (described in Example 1) | 9 |
| Resin solution (65% solids of a styrene/allyl alcohol copolymer having a weight ratio of 80/20 of styrene to allyl alcohol that has been reacted with linoleic acid and then reacted with maleic anhydride in which the ratio of styrene/allyl alcohol: linoleic acid: maleic anhydride is 49:44:7 and the resin has a Gardner Holdt viscosity of $Z^{+\frac{1}{4}}$ measured at the above solids at 25° C and the solvents are n-propanol/water/N,N'dimethyl ethanolamine in a weight ratio of 70.8/10.4/18.8 and the solution has a pH of 8.5) | 1691 |
| Loss of dry inhibitor solution (described in Example 1) | 63 |
| Water | 1972 |
| Resin solution (described above) | 745 |
| Water | 464 |
| Resin solution (described above) | 744 |
| Water | 464 |
| Total | 10,000 |

The above constituents are charged into a conventional ball mill and ground for 48,000 cycles to form a pigment dispersion that has a solids content of 59.55% by weight and a pigment to binder ratio of 182.63/100.

A primer is prepared as follows:

| | Parts by weight |
| --- | --- |
| Resin solution (described above) | 117.65 |
| Methylated melamine-formaldehyde resin solution (80% solids in isobutanol). | 42.57 |
| Methyl ethyl ketoxime | 3.34 |
| Cobalt drier solution (40% solids of a cobalt carboxylate salt of 8-20 carbon atom carboxylic | 1.93 |

-continued

| | Parts by weight |
|---|---|
| acids in mineral spirits-contains 6% by weight Cobalt) | |
| Manganese drier solution (55% solids of manganese carboxylate salt of 8-12 carbon atom carboxylic acids in mineral spirits) | 3.22 |
| Pigment Dispersion (prepared above) | 1112.14 |
| Nonionic Surfactant (formulated from higher alcohols manufactured by Drew Chemical Co.) | 12.60 |
| Total | 1293.45 |

The above constituents are charged into a mixing vessel and thoroughly mixed together to form a primer. The resulting primer has a pigment to binder ratio of 121/100 and a solids content of about 61%. The primer is reduced to a spray viscosity with water as in Example 1 and sprayed onto phosphatized steel panels and dried at room temperature (about 25° C.) for about 24 hours. The resulting primer is about 1 mil thick and has acceptable hardness and gloss.

Conventional finishes of an acrylic lacquer, an acrylic dispersion lacquer, an acrylic enamel, an acrylic dispersion enamel, an acrylic water based enamel, an alkyd resin or a polyurethane enamel are applied to metal substrates having a primer coating of the above primer. These finishes have excellent appearance, excellent adhesion to the primer and good weathering properties even after long periods of outdoor exposure and have good corrosion resistance.

I claim:

1. An aqueous primer composition comprising 5-50% by weight of a film forming binder and 50-95% by weight of an aqueous medium; wherein the binder consists essentially of a reaction product of a styrene/allyl alcohol polymer consisting essentially of 90-70% by weight styrene and 10-30% by weight allyl alcohol that has been reacted with a drying oil fatty acid and maleic acid or maleic anhydride; and the composition contains about 0.05-1.0% by weight, based on the weight of the composition, of an anionic polyelectrolyte dispersant consisting essentially of an oligomer of the formula

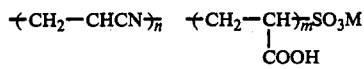

where n and m are positive integers to provide a molecular weight of about 500-2500 and M is an alkali metal and the composition contains pigments in a pigment to binder weight ratio of about 300/100 to 10/100 wherein the pigments are selected from the group consisting of talc, barytes, zinc molybdate, calcium molybdate, zinc/calcium molybdate, zinc oxide, calcium phosphosilicate and mixtures thereof, and the composition contains sufficient ammonia or an amine to provide the composition with a pH of 6.5-8.5.

2. The coating composition of claim 1 where M is sodium.

3. The coating composition of claim 2 in which the drying oil fatty acid is linoleic acid and the amine is N,N-dimethylethanolamine.

4. The coating composition of claim 3 consisting essentially of the reaction product of about 40-60% by weight, based on the weight of the reaction product, of a styrene/allyl alcohol polymer, 35-55% by weight, based on the weight of the reaction product, of drying oil fatty acids and 5-25% by weight, based on the weight of the reaction product, of maleic acid or maleic anhydride.

5. A metal substrate coated with a 0.1-5 mil thick layer of the dried coalesced primer composition of claim 1.

6. The metal substrate of claim 5 in which the metal has a phosphate coating.

7. The metal substrate of claim 5 having a 1-5 mil thick of an acrylic or alkyd resin topcoating in adherence to the primer layer.

* * * * *